United States Patent
Wang

(10) Patent No.: US 9,172,634 B2
(45) Date of Patent: Oct. 27, 2015

(54) RESTARTING A LINE CARD

(75) Inventor: Feng Wang, Beijing (CN)

(73) Assignee: HANGZHOU H3C TECHNOLOGIES CO., LTD., Zhejiang (CN)

(*) Notice: Subject to any disclaimer, the term of this patent is extended or adjusted under 35 U.S.C. 154(b) by 175 days.

(21) Appl. No.: 14/131,200

(22) PCT Filed: Jul. 30, 2012

(86) PCT No.: PCT/CN2012/079336
§ 371 (c)(1),
(2), (4) Date: Jan. 6, 2014

(87) PCT Pub. No.: WO2013/023523
PCT Pub. Date: Feb. 21, 2013

(65) Prior Publication Data
US 2014/0146660 A1    May 29, 2014

(30) Foreign Application Priority Data
Aug. 16, 2011  (CN) .......................... 2011 1 0235030

(51) Int. Cl.
*H04L 12/707* (2013.01)
*H04L 12/24* (2006.01)

(52) U.S. Cl.
CPC ............ *H04L 45/22* (2013.01); *H04L 41/0672* (2013.01)

(58) Field of Classification Search
None
See application file for complete search history.

(56) References Cited

U.S. PATENT DOCUMENTS

| 5,333,285 | A  | * | 7/1994 | Drerup ............................. 714/23 |
| 5,809,223 | A  | * | 9/1998 | Lee et al. ........................ 714/4.5 |
| 7,362,744 | B2 | * | 4/2008 | Basso et al. ................... 370/351 |
| 2006/0053332 | A1 | * | 3/2006 | Uhlmann et al. ................. 714/2 |
| 2007/0189324 | A1 | * | 8/2007 | Rose et al. ..................... 370/463 |
| 2008/0109568 | A1 | * | 5/2008 | Rengarajan et al. ............ 710/19 |
| 2011/0231833 | A1 | * | 9/2011 | Narayanan et al. ........... 717/171 |
| 2014/0146660 | A1 | * | 5/2014 | Wang ............................. 370/218 |

FOREIGN PATENT DOCUMENTS

| CN | 1979381   | 6/2007  |
| CN | 101262430 | 9/2008  |
| CN | 101478446 | 7/2009  |
| CN | 101697128 | 4/2010  |
| CN | 101841431 | 9/2010  |
| CN | 102045332 | 5/2011  |
| CN | 102081540 | 6/2011  |
| CN | 102238093 | 11/2011 |

OTHER PUBLICATIONS

CN Second Office Action dated Jan. 21, 2014 issued on CN Patent Application No. 201110235030.7 dated Aug. 16, 2011, The State Intellectual Property Office, P.R. China.
(Continued)

*Primary Examiner* — Benjamin H Elliott, IV
(74) *Attorney, Agent, or Firm* — Mannava & Kang, P.C.

(57) ABSTRACT

A method and a network device for preventing service disruption during a restart of a line card. The line card including a CPU control system and a forwarding system. Information on the CPU control system is stored in a predetermined storage and a flag is set prior to the restart of the line card. The stored information includes configuration information of the forwarding system and protocol state information of the CPU control system. The CPU control system is restarted while the forwarding system is maintained in a state of providing forwarding service. Upon detecting the flag is set during the restart of the CPU control system, the stored information is restored on the CPU control system.

19 Claims, 6 Drawing Sheets

(56) References Cited

OTHER PUBLICATIONS

CN Third Office Action dated Jun. 3, 2014 issued on CN Patent Application No. 201110235030.7 dated Aug. 16, 2011, The State Intellectual Property Office, P.R. China.

CN First Office Action dated May 17, 2013 issued on CN Patent Application No. 201110235030.7 dated Aug. 16, 2011, The State Intellectual Property Office, P.R. China.
International Search Report and Written Opinion dated Nov. 1, 2012 issued on PCT Patent Application No. PCT/CN2012/079336 dated Jul. 30, 2012, The State Intellectual Property Office, P.R. China.

* cited by examiner

RESTARTING A LINE CARD

CROSS-REFERENCE TO RELATED APPLICATION

The present application is a 371 application of International Application No. PCT/CN2012/079336 filed on Jul. 30, 2012 and entitled "Restarting a Line Card," which claims benefit of Chinese Patent App. No. CN 201110235030.7 filed on Aug. 16, 2011.

BACKGROUND

As network traffic increases, the demand for network devices with high reliability, and availability, becomes more important.

BRIEF DESCRIPTION OF DRAWINGS

Non-limiting example(s) will be described with reference to the following drawings, in which.

DETAILED DESCRIPTION

Figure 1:
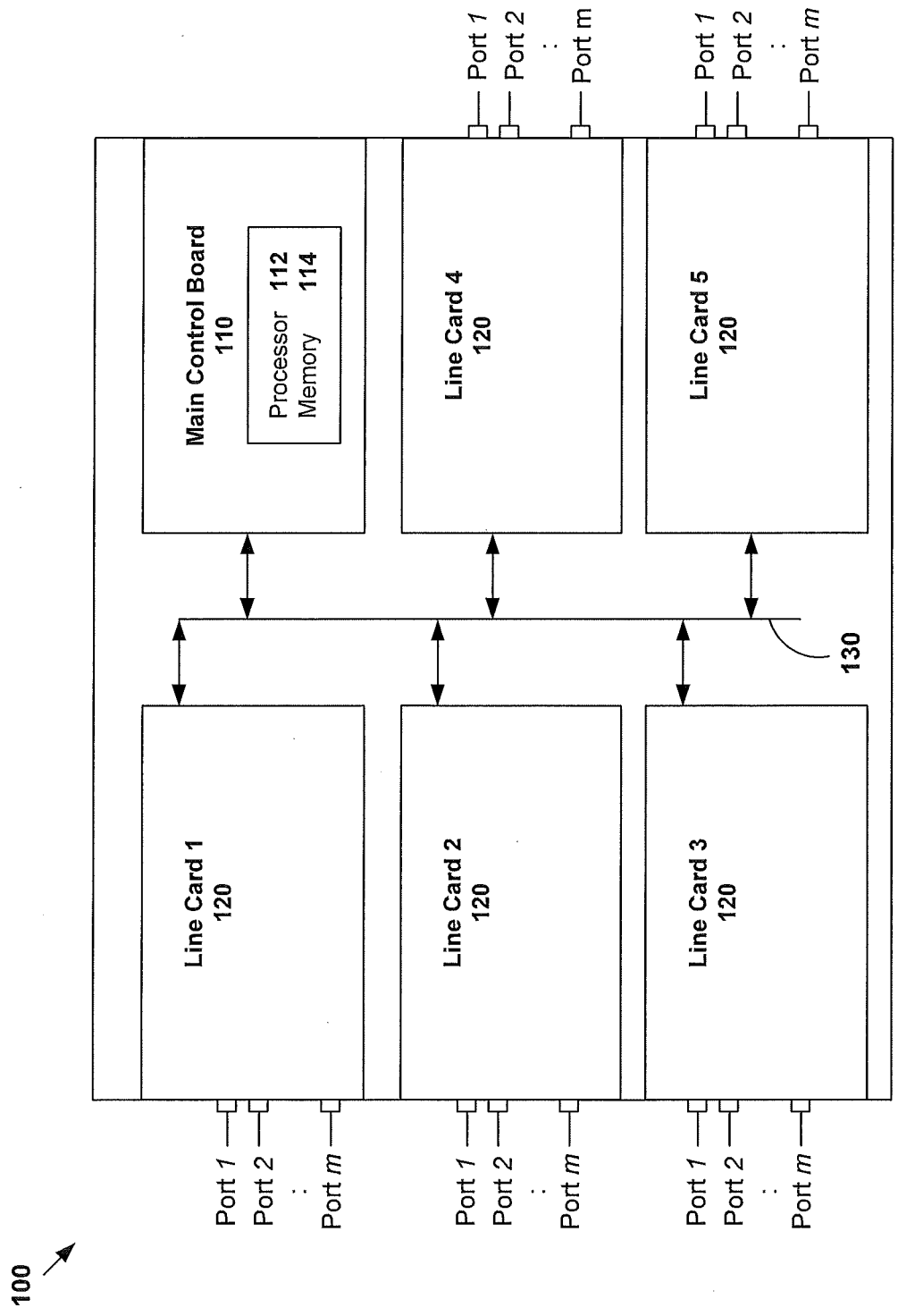
FIG. 1 is a block diagram of an example network device.

FIG. 1 shows an example structure of a network device 100 suitable for facilitating communication through a communications network. The network device 100 may be any device for receiving and forwarding network traffic, such as a switch, router, bridge, hub etc.

The network device 100 generally includes a main control board 110 and at least one line card 120 (multiple shown in FIG. 1). The main control board 110 controls the line cards 120, and includes a processor 112 and memory 114. The main control board is also known as a "main controller", "main processor", "controller card", and "main control card" etc. The processor 112 may be a central processing unit (CPU) etc.

The line cards 120 are each connected to a set of communications interfaces such as physical ports. For example, in FIG. 1, the ports are labelled 1 to m, where m may be any number and different among the line cards 120. In this example, there are five line cards labelled Line Card 1 to Line Card 5. The main control board 110 and line cards 120 are interconnected via internal forwarding paths 130, such as a shared bus or switching fabric.

Throughout this disclosure, the term "line card" is used to generally refer to a network interface, network interface card etc. for receiving and transmitting network traffic etc. Also, the term "traffic" refers to network traffic in general and will be used interchangeably with packets, frames, messages etc.

Figure 2:
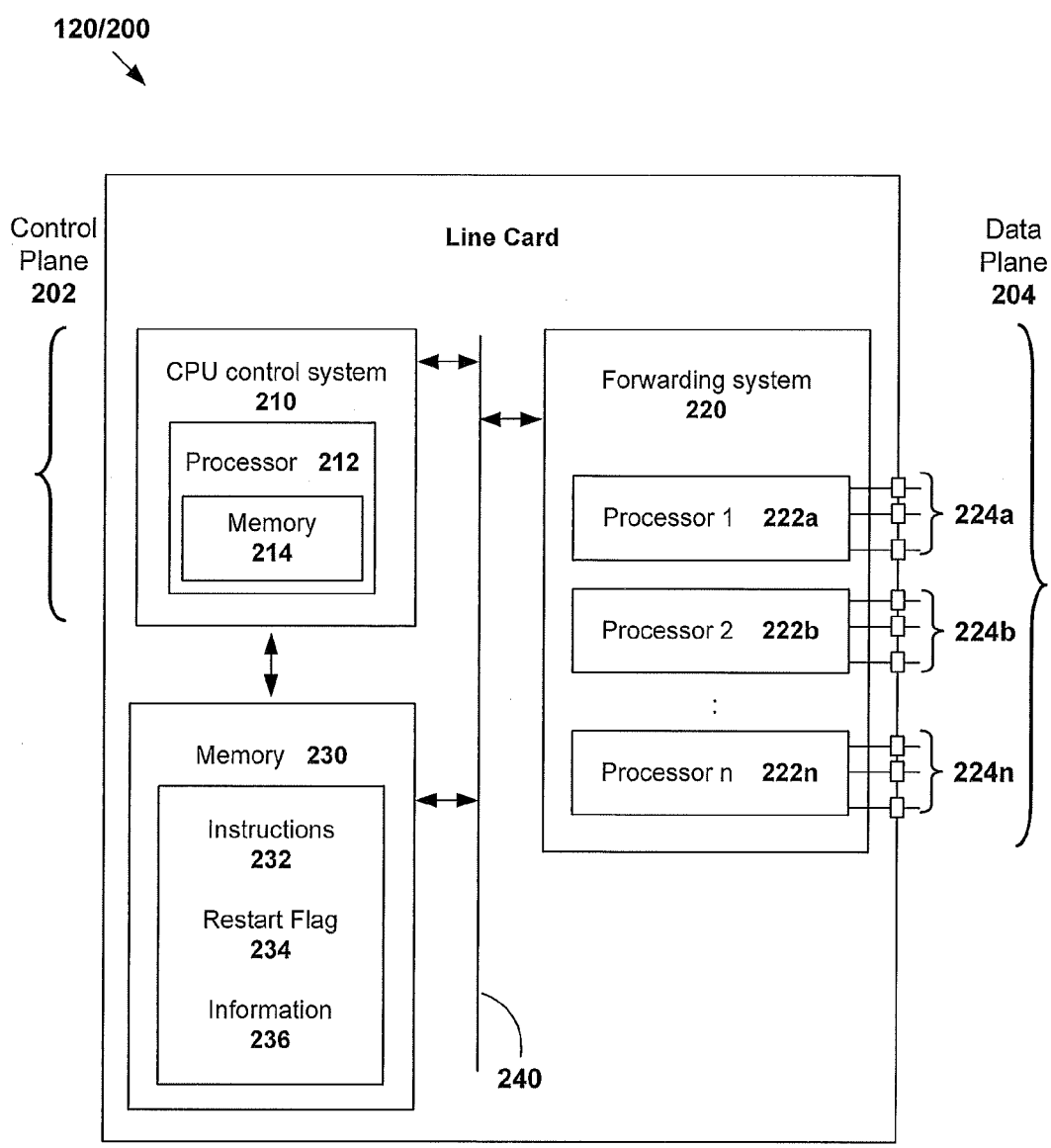
FIG. 2 is a block diagram of an example line card.

In more detail, FIG. 2 shows an example structure of a line card 200, which includes:

(a) CPU control system 210 for performing control plane 202 functionalities, which include execution of network protocols and configuration of forwarding information.

(b) Forwarding system 220 for performing data plane 204 functionalities, which include forwarding network traffic based on the forwarding information configured by the CPU control system 210. The forwarding system 220 is also known as a "chip forwarding system" or "forwarding chip system".

The CPU control system 210 has access to memory or storage device 230 in which information required for control plane functionalities is stored. In the example in FIG. 2, the storage device 230 stores machine-executable instructions 232, a restart flag 234 and other information 236 necessary for its operation, such as the forwarding information, and information relating to execution of network protocols. The forwarding information may be in the form of a forwarding table with multiple forwarding entries.

The forwarding system 220 may include one or more processors 222a to 222n that are respectively connected to multiple ports 224a to 224n to receive or transmit network traffic. A processor 222 may be implemented using a general-purpose processor, dedicated logic, or a combination of both. For example, a processor 222 may be an ASIC (application-specific integrated circuit) chip, NP (network processor) chip, FPGA (field-programmable gate array) chip etc. The "processor" 222 is also known as a "forwarding chip" and "forwarding integrated circuit" etc.

The network device 100 may have a centralized architecture (in which case network device 100 is also known as a "centralized device"), or distributed architecture (in which case the network device 100 is also known as a "distributed device"). For a network device 100 with a centralized architecture, forwarding information is generally configured centrally for the line cards. On the other hand, for a network device 100 with distributed architecture, the task is generally distributed over multiple processors in one or more network devices 110.

Once the network device 100 is deployed onto a network, there are times when it is necessary to restart or reset one or more line cards 200 on the network device 100. The line card 200 may be restarted for any purposes, such as to modify software on the line card 200. Software modifications may be software upgrades to enhance the software, and/or fix to programming errors, and in some scenarios, software downgrades to revert to a previous software version.

Figure 3:
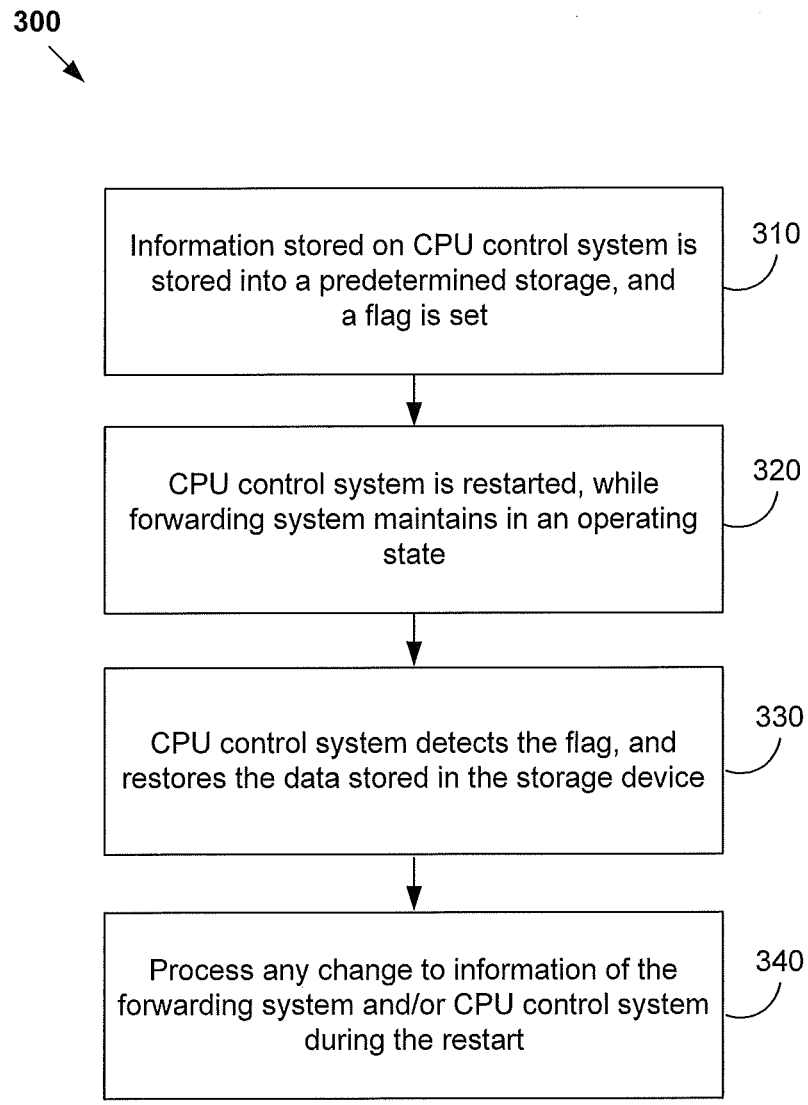
FIG. 3 is a flowchart of an example method for restarting a line card.

FIG. 3 is a flowchart of an example method for operating a line card 200 having a CPU control system 210 and a forwarding system 220.

At block 310, information stored on the CPU control system 210 is stored into a predetermined storage, and a flag is set.

For ease of description, the relevant information on the CPU control system 210 that is stored for later restoration is referred to as "shadow" information throughout this disclosure. The shadow information includes protocol state information of the CPU control system 210 and configuration information of the forwarding system 220. The flag will also be referred to as a "control system restart flag" or "restart flag".

At block 320, the CPU control system 210 is restarted while the forwarding system 220 is maintained in an operating state. Specifically, the forwarding system 220 is maintained in a state it provides forwarding service while the CPU control system 210 restarts.

At block 330, the CPU control system 210 detects the flag set at block 310 during its restart process, and restores the shadow information stored on the predetermined storage.

At block 340, after the CPU control system is restarted, a "smooth check mechanism" or "smoothing operation" is performed to process any change to the information of the forwarding system 220 and/or the CPU control system during the restart.

In the example method, it is not necessary to restart both the CPU control system 210 and forwarding system 220 when the line card 200 is restarted, such as for the purpose of software upgrade. This is because, for example, the process of upgrading a line card only concerns with upgrading the CPU control system 210 and does not concern the forwarding system 220.

Since the forwarding system 220 is not restarted, the forwarding system 220 is able to provide continuous traffic forwarding service when the CPU control system 210 is restarted. This reduces, if not prevents, service disruption. Further, using the example method, downtime due to termination of network traffic while a line card 200 is restarted is minimised.

The example method in FIG. 3 will be explained in more detail below.

Pre-Restart Operations

At block 310 in FIG. 3, prior to restarting the CPU control system 210, the CPU control system 210 stores "shadow information" in a predetermined storage, and sets a "control system restart" flag before the CPU control system 210 is restarted.

The shadow information includes protocol state information of the CPU control system 210 and configuration information of the forwarding system 220. Storing the shadow information ensures that the CPU control system 210 is able to restore configuration information of the forwarding system 220 after it restarts, and does not re-initialise the information.

The protocol state information of the CPU control system 210 may include any information related to execution of network protocols, such as network routing information, and states of the protocols etc. The configuration information of the forwarding system 220 includes hardware-related information, such as the UP/DOWN state of the ports 224 (a to n) of the forwarding system 220.

The configuration information of the forwarding system 220 may be associated with operation in a driver layer of the line card 200. Other information, such as configuration information and protocol state information associated with a layer above the driver layer, may also be stored in the predetermined storage.

In one example implementation, the CPU control system 210 may store the shadow information, and set the flag, upon receiving a restart command from the main control board 110 on the network device.

It will be appreciated that the order of storing the shadow information and setting the flag is not important. For example, the restart flag 234 may be set before, while or after the "shadow" information is stored, and vice versa. Also, although FIG. 2 shows that the restart flag 234 in the memory 230 on the line card 200, the restart flag may be stored in any storage accessible by the CPU control system 210, such as on a different line card 200 or on the main control board 110.

The "predetermined storage" may be implemented using hardware or software, or a combination of both. For example, the predetermined storage may be one of the following:
  (a) An on-board storage device on the line card 200, such as the memory 230 shown in FIG. 2.
  (b) An external storage device on the network (not shown in FIG. 2) that is accessible by the CPU control system 210. And,
  (c) A reserved memory on the line card 200, such as memory 214 reserved on the CPU 212 in FIG. 2.

Optionally, the forwarding system 220 may also perform one or more operations before the CPU control system 210 is restarted. In one example implementation, one or more processors 222 of the forwarding system 220 are requested to deactivate any write function into memory allocated by the CPU control system 210.

More specifically, during its normal operation, one or more processors 222 of the forwarding system 220 requests the CPU control system 210 to allocate a fixed-sized memory as a buffer for traffic forwarding purposes. The forwarding system 220 writes information such as MAC (medium access control) addresses into the buffer, after which it notifies the CPU control system 210 to read the information.

When the line card 200 undergoes a restart or reset, the CPU control system 210 is restarted. The buffer previously allocated to a processor (e.g. 222a) may have been re-allocated to a different processor (e.g. 222b). As such, if the processor (222a) continues to write the address information into the buffer, a system exception may occur. To eliminate this problem, the processor (e.g. 222a) is instructed to deactivate its write buffer function.

It will be appreciated that the forwarding system 220 may be allocated with multiple buffers, in which case write functions associated with these buffers are deactivated before the CPU control system 210 is restarted.

Restart

At block 320 in FIG. 3, the CPU control system 210 is restarted, while the forwarding system 220 is maintained in an operating state (or a state of providing forwarding service).

In one example implementation, the process of restarting the CPU control system includes the main control board 110 configuring a restart command on the CPU control system 210. Upon receiving the restart command, the CPU control system 210 restarts after storing the shadow information and setting the flag according to block 310.

The CPU control system 210 may be restarted using any suitable methods, such as the "kexc" or "kexec" mechanism of a Linux kernel to boot new software; Bootware (BIOS) and other processes for reloading and executing new software etc.

On the other hand, the forwarding system 220 is not configured with a restart command and continues its traffic forwarding service. As such, even when the CPU control system 210 is restarted, the forwarding system 220 on the line card 200 remains in a state of providing continuing forwarding service. This reduces, if not prevents, disruption to the traffic forwarding service by the forwarding system 220.

Of course, any other processes that restart the CPU control system 210, while allowing the forwarding system 220 to continue its operation independently, may be used at block 320.

Information Restoration

At block 330 in FIG. 3, during the restart process, the CPU control system 210 detects the control system restart flag 234 set at block 310 and restores the shadow information stored at block 310. The restoration may occur during an initialisation step of the restart.

After restoring the information, the CPU control system 210 can function as normal, and enters a steady state again. Since the forwarding system 220 can operate independently during the restart of the CPU control system 210, disruption of traffic forwarding is minimised, if not prevented.

Proxy Process

In some implementations, line cards 200 may execute one or more network protocols such as DLDP (Device Link Detection Protocol) for detecting link status of a network link such as a fiber cable or twisted pair; STP (Spanning Tree Protocol) for ensuring a loop-free topology in a network; and LACP (Link Aggregation Control Protocol) for link aggregation etc.

These network protocols require interconnected network devices 110 to exchange protocol messages or notifications. The "protocol messages" may be any messages necessary for execution of network protocols. If one network device 100 does not receive any protocol message from a peer device for a period of time, the network device 100 assumes that there is a problem at the peer device.

For example, during the restart of the line card 200 on a network device 100, the line card 200 is unable to send protocol messages to peer devices while the CPU control system 210 restarts. This causes a "timeout" at the peer device, resulting in abnormality in the protocol execution. Depending on the network protocol, the network device 100 may shut down a local port that connects with the peer device or remove the peer device as a possible route.

Figure 4:
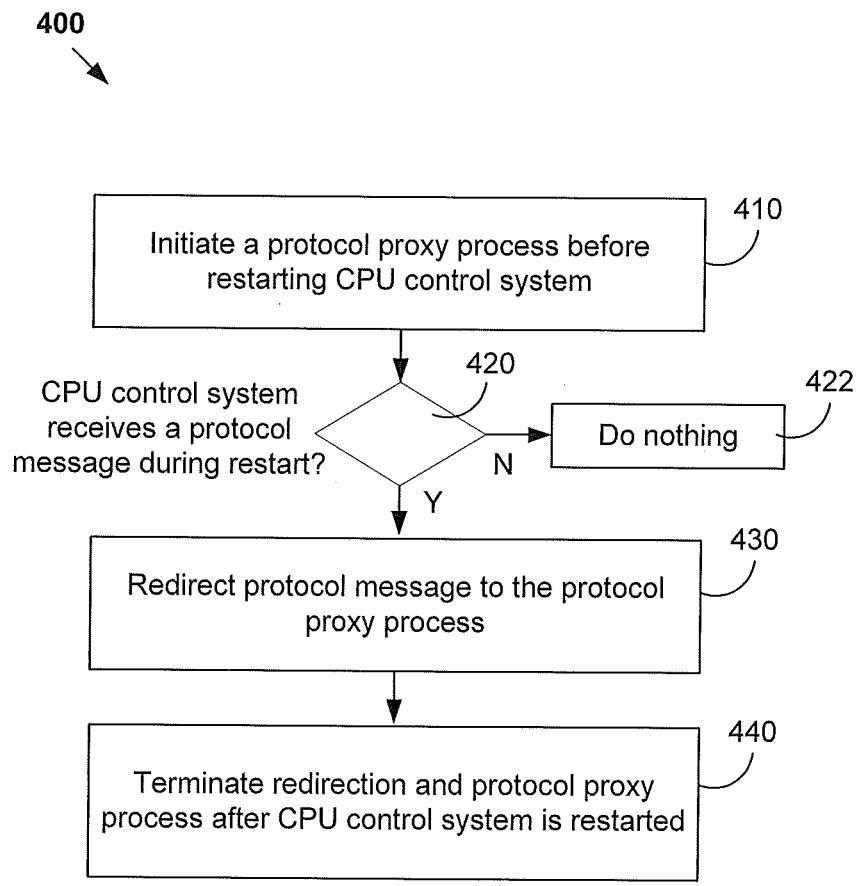
FIG. 4 is a flowchart of an example proxy process.

To handle protocol messages such as those relating to the status of the network device 100 while the CPU control system 210 restarts, a "proxy process" or "protocol proxy process" may be initiated. An example is shown in FIG. 4, in which:

At block 410, a proxy process is initiated before the CPU control system 210 on a line card 200 is restarted. The initiation may occur at any time for the restart, such as before, after or while the shadow information is stored or the flag is set at block 310 in FIG. 3.

At blocks 420 and 430, if the CPU control system 210 receives one or more protocol messages during its restart, the one or more received protocol messages are redirected to the proxy process for processing. Otherwise, there is nothing to do; see block 422.

At block 440, the proxy process and redirection are terminated after the CPU control system 210 has restarted, and entered a steady state for example. After this, protocol messages received are no longer redirected to the proxy process and will be processed by the CPU control system 210 as usual.

Figure 5:
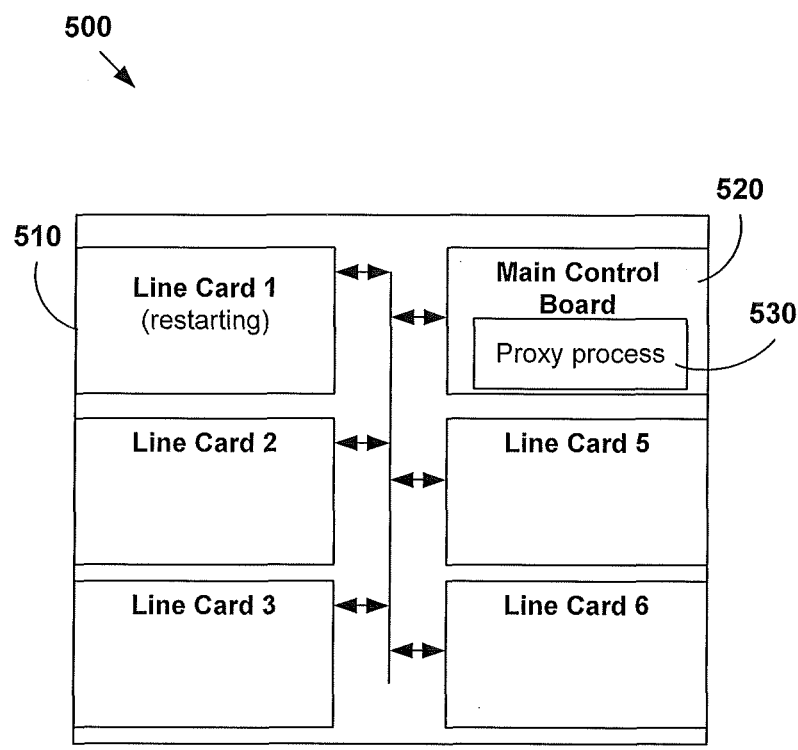
FIG. 5 is a block diagram of an example network device having a distributed architecture and an example proxy process.

If the line card 200 is on a network device 100 having a distributed architecture, the proxy process may be initiated on a main control board of the network device 100. For example, FIG. 5 shows a network device 500 having a line card (Line Card 1 510) restarted. In this case, the proxy process 530 is initiated on the main control board 520 of the network device.

If the line card 200 is on a network device 100 having a centralized architecture, the proxy process may be initiated on a different card on the network device 100, or on another network device 100 on the network. In the example in FIG. 6, Line Card 1 on Device 1 is being restarted. In this case, the proxy process 630 may be initiated on a different card on the same network device such as the main control board 620 or a different line card (e.g. Line Card 2). Alternatively, the proxy process 650 may be initiated on another network device, such as on the main control board 640 of Device 2.

The example proxy process according to FIG. 4 increases the efficiency of protocol processing. It also reduces, if not eliminates, the likelihood of disruption of traffic forwarding and abnormality in protocol processing while the CPU control system 210 is restarted.

Graceful restart (GR) mechanism may also be used. In this case, peer devices are informed by way of GR messages that the CPU control system 210 is restarting. This prevents the peer devices from assuming that the associated line card 200 or network device 100 has gone down and removing all routes from the line card 200 or network device 100. Instead, the peer devices temporarily preserve its adjacency with the restarting device 110, and help it store its routing information after it restarts. GR is supported by various network protocols, such as IS-IS (Intermediate System to Intermediate System), BGP (Broader Gateway Protocol) and OSPF (Open Shortest Path First) etc.

Smoothing Operation

Referring to FIG. 3 again, after the CPU control system 210 restarts, any changes in the information in the CPU control system 210 and/or the forwarding system 220 is processed at block 340.

For example, while the CPU control system 210 restarts, a port or interface connected to the forwarding system 220 might changes its status from UP to DOWN. In this case, there will be a discrepancy between the CPU control system's 210 stored shadow information and the most up-to-date information, and the changes should be processed accordingly.

In one implementation, the changes are processed by initiating a "smooth check mechanism" or "smoothing operation" between the CPU control system 210 and forwarding system 220. This resolves any discrepancy between the restored information and the change to the information on the forwarding system 220 and/or on the CPU control system 210.

For example, if the line card 200 is on a network device 100 having a distributed architecture, any changes of the information of the CPU control system 210 and/or forwarding system 220 may be obtained from a main control board 110 of the network device 100; see FIG. 5 again.

For example, if the line card 200 is on a network device 100 having a centralised architecture, any changes of the information of the CPU control system 210 and/or forwarding system 220 may be obtained from another network device on an external network (e.g. Device 2); see FIG. 6 again. The changes may also be obtained from a different card (e.g. main control board of Device 1) on the same network device 100.

Figure 6:
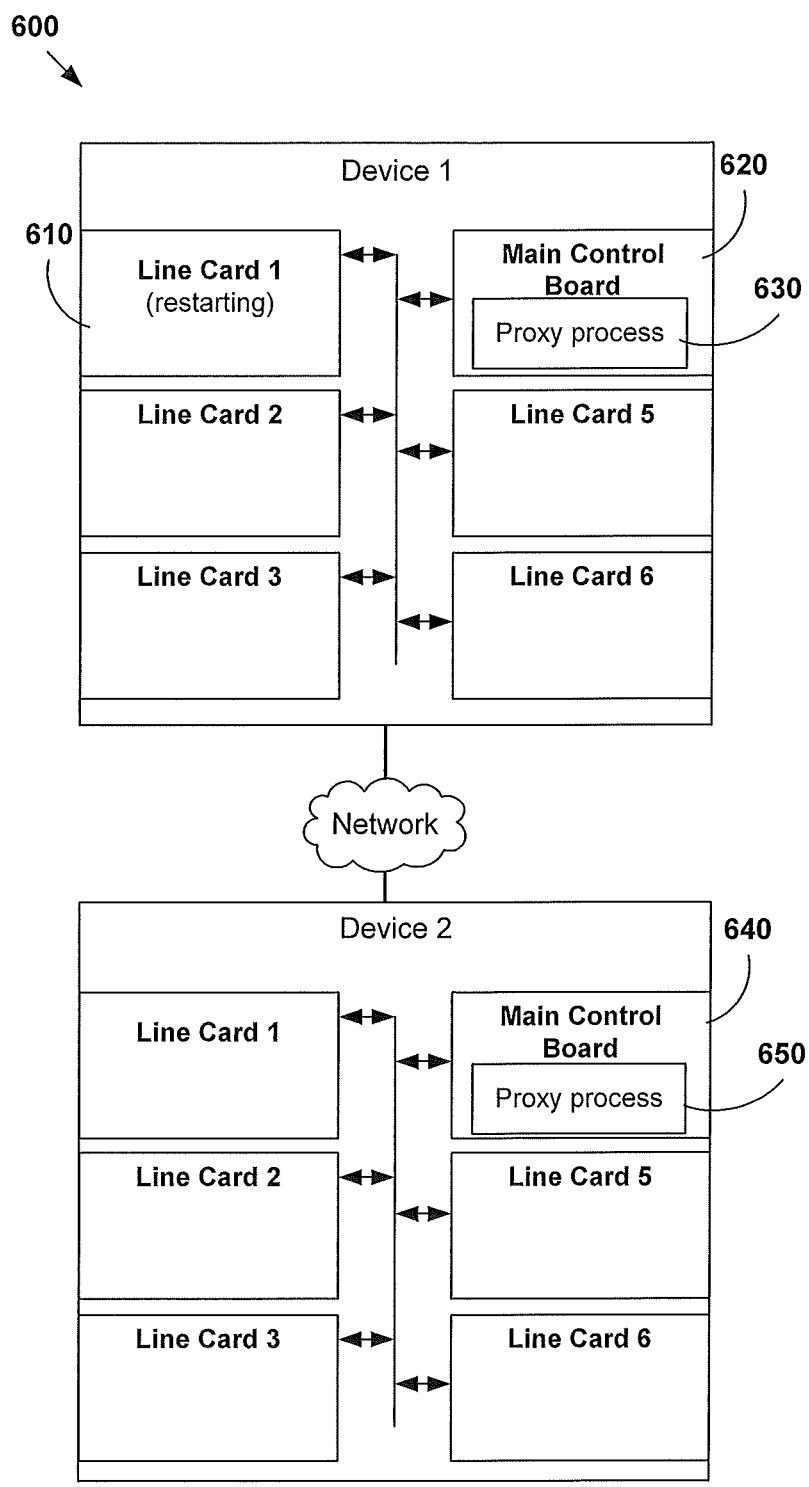
FIG. 6 is a block diagram of an example network device having a centralised architecture and an example proxy process.

In one example implementation, after the CPU control system 210 on the line card 200 restores the shadow information, it obtains a copy of the information stored on the relevant main control board (e.g. 520 in FIG. 5, 620, 640 in FIG. 6). If there is any discrepancy between the restored information and the obtained information, the shadow information will be updated according to the obtained information in order to resolve the discrepancy.

Network Device 100

The methods, processes and functional units described herein may be implemented by hardware (including hardware logic circuitry), software or firmware or a combination thereof.

The terms 'processor' (e.g. 112 in FIGS. 1 and 212 in FIG. 2) is to be interpreted broadly to include a processing unit, ASIC (application-specific integrated circuit), logic unit, or programmable gate array etc. The processes, methods and functional units may all be performed by the one or more processors; reference in this disclosure or the claims to a 'processor' should thus be interpreted to mean 'one or more processors'. Similarly, reference in this disclosure or the claims to a 'CPU' should thus be interpreted to mean 'one or more CPUs'.

Further, the processes, methods and functional units described in this disclosure may be implemented in the form of a computer software product. The computer software product is stored in a storage medium and comprises machine-executable instructions for making a processor to implement the example methods according to FIG. 3 and FIG. 4.

For example, machine-executable instructions may be stored in the memory 114 on the main control board 110 to cause the processor 112 to send a restart command to the CPU control system 210 of a line card 200 before the restart process. Further, machine-executable instructions may be stored in the memory 114 on the main control board 110 to cause the processor 112 to implement the proxy process according to the example in FIG. 4.

For example, machine-executable instructions may be stored in the memory 230 of a line card 200 to cause the processor 212 to store the relevant information and set the flag according to block 310; restart according to block 320 and restore the information according to block 330. Further machine-executable instructions may be stored in the memory 230 of a line card 200 to cause the processor 212 to perform the smoothing operation according to block 340 and to initiate and terminate the proxy process according to blocks 410 and 440.

The figures are only illustrations of an example, wherein the units or procedure shown in the figures are not necessarily essential for implementing the present disclosure. Those skilled in the art will understand that the units in the device in the example can be arranged in the device in the examples as described, or can be alternatively located in one or more devices different from that in the examples. The units in the examples described can be combined into one module or further divided into a plurality of sub-units.

Although the flowcharts described show a specific order of execution, the order of execution may differ from that which is depicted. For example, the order of execution of two or more blocks may be changed relative to the order shown. Also, two or more blocks shown in succession may be executed concurrently or with partial concurrence. All such variations are within the scope of the present disclosure.

It will be appreciated that numerous variations and/or modifications may be made to the processes, methods and functional units as shown in the examples without departing from the scope of the disclosure as broadly described. The examples are, therefore, to be considered in all respects as illustrative and not restrictive.

The invention claimed is:

1. A method for preventing service disruption during a restart of a line card, the line card including a CPU control system and a forwarding system, the method comprising:
storing information on the CPU control system in a predetermined storage and setting a flag prior to the restart of the line card, wherein the stored information includes configuration information of the forwarding system and protocol state information of the CPU control system;
restarting the CPU control system while maintaining the forwarding system in a state of providing forwarding service; and
upon detecting the flag is set during the restart of the CPU control system, restoring the stored information on the CPU control system.

2. The method according to claim 1, further comprising:
after restoring the stored information, processing any change to information of the forwarding system or the CPU control system during the restart of the CPU control system.

3. The method according to claim 2, further comprising:
obtaining any change to the information of the forwarding system or the CPU control system; and
initiating a smoothing operation to process the change.

4. The method according to claim 1, wherein the predetermined storage is one of the following:
a storage device on the line card;
a network storage device accessible by the line card; and
a reserved memory on the line card.

5. The method according to claim 1, further comprising:
prior to restarting the CPU control system, initiating a proxy process to handle one or more protocol messages received during the restart of the CPU control system.

6. The method according to claim 5, further comprising:
redirecting one or more protocol messages received during the restart of the CPU control system to the proxy process; and
after the CPU control system restarts, terminating the proxy process and the redirection of protocol message.

7. The method according to claim 5 wherein when the line card is on a network device having a distributed architecture, the proxy process is initiated on a main control board of the network device.

8. The method according to claim 5 wherein when the line card is on a network device having a centralized architecture, the proxy process is initiated on a different card on the network device, or on a different network device having a centralized architecture.

9. A network device for preventing service disruption during a restart of a line card, the line card including a CPU control system and a forwarding system, the network device comprising a processor to:
store information on the CPU control system in a predetermined storage and setting a flag prior to the restart of the line card, wherein the stored information includes configuration information of the forwarding system and protocol state information of the CPU control system;
restart the CPU control system while maintaining the forwarding system in a state of providing forwarding service; and
upon detecting the flag is set during the restart of the CPU control system, restore the stored information on the CPU control system.

10. A method for restarting a line card, the line card including a CPU control system and a forwarding system, the method comprising:
storing information on the CPU control system in a predetermined storage and setting a flag, wherein the stored information includes configuration information of the forwarding system and protocol state information of the CPU control system;
restarting the CPU control system while maintaining the forwarding system in an operating state; and
upon detecting that the flag is set, restoring the stored information on the CPU control system.

11. The method according to claim 10, further comprising:
obtaining any change to information of the forwarding system or the CPU control system; and
initiating a smoothing operation to process the change to resolve discrepancy between the restored information and the change to the information on the forwarding system or on the CPU control system.

12. The method according to claim 10, wherein the predetermined storage is one of the following:
a storage device on the line card;
a network storage device accessible by the line card; and
a reserved memory on the line card.

13. The method according to claim 10, further comprising:
prior to restarting the CPU control system, initiating a proxy process to handle one or more protocol messages received during the restart of the CPU control system.

14. The method according to claim 13, further comprising:
redirecting one or more protocol messages received during the restart of the CPU control system to the proxy process; and after the CPU control system restarts, terminating the proxy process and the redirection of protocol message.

15. The method according to claim 13, wherein when the line card is on a network device having a distributed architecture, the proxy process is initiated on a main control board of the network device.

16. The method according to claim 13, wherein when the line card is on a network device having a centralized architecture, the proxy process is initiated on a different card on the network device, or on a different network device having a centralized architecture.

17. The method according to claim 10, further comprising:

prior to restarting the CPU control system, deactivating one or more write functions by the forwarding system into a memory allocated by the CPU control system.

18. A network device comprising at least one line card that includes a CPU control system and a forwarding system, and one or more processors to:

store information on the CPU control system in a predetermined storage and setting a flag, wherein the stored information includes configuration information of the forwarding system and protocol state information of the CPU control system;

restart the CPU control system while maintaining the forwarding system in an operating state; and upon detecting that the flag is set, restore the stored information on the CPU control system.

19. A non-transitory computer readable medium encoded with executable instructions for execution by one or more processors of a network device to restart a line card, wherein the line card includes a CPU control system and a forwarding system and the executable instructions comprises:

storing information on the CPU control system in a predetermined storage and setting a flag, wherein the stored information includes configuration information of the forwarding system and protocol state information of the CPU control system;

restarting the CPU control system while maintaining the forwarding system in an operating state; and upon detecting that the flag is set, restoring the stored information on the CPU control system.

* * * * *